(12) United States Patent
Kim (10) Patent No.: US 11,358,480 B2
(45) Date of Patent: Jun. 14, 2022

(54) VEHICLE INCLUDING FUEL CELL AND RESIDUAL ENERGY DISCHARGE METHOD PERFORMED IN THE VEHICLE

(71) Applicants: HYUNDAI MOTOR COMPANY, Seoul (KR); KIA MOTORS CORPORATION, Seoul (KR)

(72) Inventor: Ju Han Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 292 days.

(21) Appl. No.: 16/832,543

(22) Filed: Mar. 27, 2020

(65) Prior Publication Data

US 2021/0114469 A1    Apr. 22, 2021

(30) Foreign Application Priority Data

Oct. 18, 2019   (KR) .................. 10-2019-0129977

(51) Int. Cl.
*B60L 50/71* (2019.01)
*B60W 30/08* (2012.01)

(52) U.S. Cl.
CPC ............ *B60L 50/71* (2019.02); *B60W 30/08* (2013.01); *B60L 2210/10* (2013.01); *B60W 2030/082* (2013.01)

(58) Field of Classification Search
CPC ..... B60L 50/71; B60L 2210/10; B60W 30/08; B60W 2030/082
USPC .............................. 180/65.31; 307/9.1, 10.1
See application file for complete search history.

(56) References Cited

U.S. PATENT DOCUMENTS

2018/0345819 A1*  12/2018  Cai .................. H01M 8/04302

FOREIGN PATENT DOCUMENTS

| JP | 2005-340002 A | 12/2005 |
|----|---------------|---------|
| JP | 5086941 B2 | 11/2012 |

* cited by examiner

*Primary Examiner* — Hal Kaplan
(74) *Attorney, Agent, or Firm* — Morgan, Lewis & Bockius LLP (57) ABSTRACT

A vehicle having a fuel cell includes a cell stack including a plurality of unit cells stacked on one another, a direct current/direct current (DC/DC) converter configured to convert the level of stack voltage output from the cell stack and including a discharger to remove residual energy thereof, a power distributor configured to distribute the level-converted voltage output from the DC/DC converter or to provide voltage remaining in the cell stack to the discharger to discharge the voltage in response to first control signals, and a controller configured to generate the first control signals depending on whether the vehicle is traveling normally.

19 Claims, 9 Drawing Sheets

VEHICLE INCLUDING FUEL CELL AND RESIDUAL ENERGY DISCHARGE METHOD PERFORMED IN THE VEHICLE

CROSS-REFERENCE TO RELATED APPLICATION

The present application claims the benefit of priority to Korean Patent Application No. 10-2019-0129977, filed on Oct. 18, 2019 in the Korean Intellectual Property Office, the entire disclosure of which is hereby incorporated by reference.

TECHNICAL FIELD

Embodiments of the present disclosure relate to a vehicle including a fuel cell and a residual energy discharge method performed in the vehicle.

BACKGROUND

In a vehicle equipped with a fuel cell including a cell stack, there is the need to remove oxygen from an air channel of the cell stack after the vehicle is turned off in order to improve the durability of the cell stack. Alternatively, in the event of a collision of a vehicle including a fuel cell, there is the need to remove electric energy remaining in the cell stack in order to prevent an electric shock accident or an electrical fire. Alternatively, when a vehicle is turned off and thereafter is maintained and repaired, there is the need to remove electric energy remaining in the cell stack in order to prevent an electric shock accident.

As such, when a vehicle including a fuel cell is turned off, collides with another vehicle or the like, or is maintained and repaired, it is very important to remove electric energy remaining in a cell stack and thus to secure the electrical safety of the vehicle including the fuel cell.

The above information disclosed in this Background section is only for enhancement of understanding of the background of the present disclosure, and should not be taken as acknowledgement that this information forms the prior art that is already known to a person skilled in the art.

SUMMARY

Accordingly, embodiments are directed to a vehicle including a fuel cell and a residual energy discharge method performed in the vehicle that substantially obviate one or more problems due to limitations and disadvantages of the related art.

One objective of the present disclosure is to provide a vehicle including a fuel cell and a residual energy discharge method performed in the vehicle for stably discharging and removing voltage remaining in a cell stack when the vehicle is turned off or is involved in a collision.

In one exemplary embodiment of the present disclosure, a vehicle having a fuel cell may include a cell stack including a plurality of unit cells stacked on one another, a direct current/direct current (DC/DC) converter configured to convert the level of stack voltage output from the cell stack and including a discharger to remove residual energy thereof, a power distributor configured to distribute the level-converted voltage output from the DC/DC converter or to provide voltage remaining in the cell stack to the discharger to discharge the voltage in response to first control signals, and a controller configured to generate the first control signals depending on whether the vehicle is traveling normally.

For example, the vehicle may further include a cooling line configured to cool the DC/DC converter, and the discharger may be disposed in the cooling line.

For example, the vehicle may further include a battery configured to be charged with the level-converted voltage distributed by the power distributor depending on the levels of second control signals or depending on whether the second control signals are being generated, and the controller may generate the second control signals depending on whether the vehicle is traveling normally.

For example, the power distributor may include a first switching unit configured to form a first path along which the level-converted voltage output from the DC/DC converter is provided to the battery depending on whether a $1\text{-}1^{st}$ control signal is being generated, the $1\text{-}1^{st}$ control signal being one of the first control signals, and a second switching unit configured to form a second path along which voltage remaining in the cell stack is provided to the discharger depending on whether a $1\text{-}2^{nd}$ control signal is being generated, the $1\text{-}2^{nd}$ control signal being another one of the first control signals.

For example, the power distributor may include a first switching unit configured to form a first path along which the level-converted voltage output from the DC/DC converter is provided to the battery depending on the level of the $1\text{-}1^{st}$ control signal, which is one of the first control signals, and a second switching unit configured to form a second path along which voltage remaining in the cell stack is provided to the discharger depending on the level of the $1\text{-}2^{nd}$ control signal, which is another one of the first control signals.

For example, when the vehicle is not traveling normally, the controller may stop generating the $1\text{-}2^{nd}$ control signal.

For example, the vehicle may further include a vehicle ON/OFF determiner configured to determine whether the vehicle has been turned off, and the controller may stop generating the $1\text{-}2^{nd}$ control signal depending on the result of a determination by the vehicle ON/OFF determiner.

For example, the vehicle may further include a collision determiner configured to determine whether the vehicle has been involved in a collision, and the controller may stop generating the $1\text{-}2^{nd}$ control signal depending on the result of a determination by the collision determiner.

For example, the DC/DC converter may include a first output terminal and a second output terminal, the level-converted voltage may correspond to a potential difference between the first output terminal and the second output terminal, and the first switching unit may include a first switch disposed in a first line interconnecting the first output terminal and the battery while being disposed therebetween, the first switch being configured to be switched on or off depending on whether the $1\text{-}1^{st}$ control signal is being generated, and a second switch disposed in a second line interconnecting the second output terminal and the battery while being disposed therebetween, the second switch being configured to be switched on or off depending on whether the $1\text{-}1^{st}$ control signal is being generated.

For example, the second switching unit may include a third switch interconnecting the first output terminal and one end of the discharger while being disposed therebetween, the third switch being configured to be switched on or off depending on whether the $1\text{-}2^{nd}$ control signal is being generated, and the opposite end of the discharger may be connected to the second output terminal.

For example, the second switching unit may include a fourth switch interconnecting the second output terminal and the opposite end of the discharger while being disposed therebetween, the fourth switch being configured to be switched on or off depending on whether the 1-$2^{nd}$ control signal is being generated, and the one end of the discharger may be connected to the first output terminal.

For example, the battery may include a charger configured to be charged with the level-converted voltage and a third switching unit configured to form a third path along which the level-converted voltage is charged in the charger depending on whether the second control signals are being generated or depending on the levels of the second control signals.

For example, the third switching unit may include a fifth switch disposed between the first line and the charger, the fifth switch being configured to be switched on or off depending on whether a 2-$1^{st}$ control signal is being generated or depending on the level of the 2-$1^{st}$ control signal, the 2-$1^{st}$ control signal being one of the second control signals, and a sixth switch disposed between the second line and the charger, the sixth switch being configured to be switched on or off depending on whether a 2-$2^{nd}$ control signal is being generated or depending on the level of the 2-$2^{nd}$ control signal, the 2-$2^{nd}$ control signal being another one of the second control signals.

For example, the DC/DC converter and the power distributor may be directly and electrically connected to each other.

For example, the vehicle may further include a case configured to accommodate the DC/DC converter and the power distributor.

For example, the vehicle may further include a wire configured to electrically connect the DC/DC converter and the power distributor to each other, and the case may include a first case configured to accommodate the DC/DC converter and a second case configured to accommodate the power distributor.

For example, the discharger may have a resistance value of 1Ω to 10Ω.

In another exemplary embodiment of the present disclosure, a residual energy discharge method, which is performed in a vehicle having a fuel cell including a cell stack in which a plurality of unit cells is stacked on one another, and a DC/DC converter configured to convert the level of stack voltage output from the cell stack and including a discharger to remove residual energy thereof, may include determining whether the vehicle is traveling normally, upon determining that the vehicle is traveling normally, distributing the level-converted voltage output from the DC/DC converter, and upon determining that the vehicle is not traveling normally, providing voltage remaining in the cell stack to the discharger to discharge the voltage.

For example, the determining whether the vehicle is traveling normally may include at least one of determining whether the vehicle has been turned off or determining whether the vehicle has been involved in a collision, and upon determining that the vehicle has been turned off or that the vehicle has been involved in a collision, it may be determined that the vehicle is not traveling normally.

BRIEF DESCRIPTION OF THE DRAWINGS

Arrangements and embodiments may be described in detail with reference to the following drawings in which like reference numerals refer to like elements and wherein.

DETAILED DESCRIPTION

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a vehicle including a fuel cell according to exemplary embodiments of the present disclosure will be described with reference to the accompanying drawings.

Figure 1:
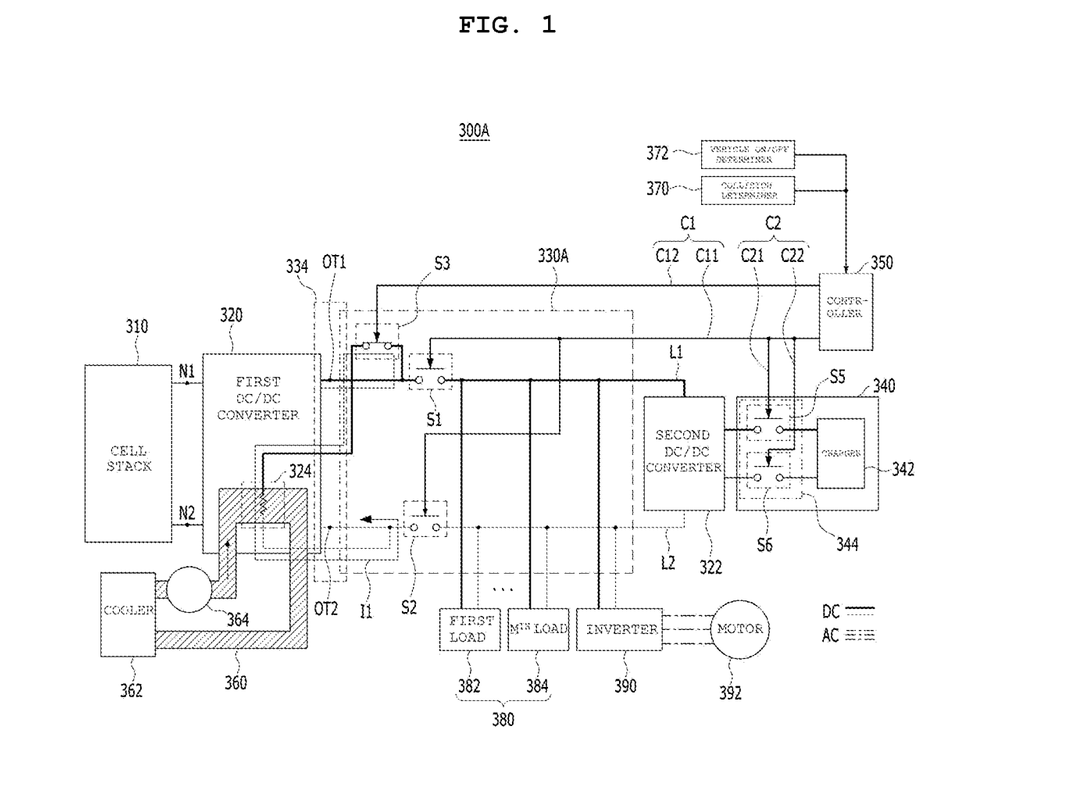
FIG. 1 is a block diagram of a vehicle including a fuel cell according to an exemplary embodiment of the present disclosure.

FIG. 1 is a block diagram of a vehicle 300A including a fuel cell according to an exemplary embodiment of the present disclosure.

Referring to FIG. 1, the vehicle 300A according to an exemplary embodiment of the present disclosure may include a cell stack 310, a first direct current/direct current converter (DC/DC converter) 320, a power distributor 330A, a battery 340, and a controller 350.

First, an example of a fuel cell, which may be included in the vehicle 300A, will be described below with reference to the accompanying drawings. The embodiment is not limited to any specific form of a fuel cell included in the vehicle 300A.

The fuel cell may be, for example, a polymer electrolyte membrane fuel cell (or a proton exchange membrane fuel cell) (PEMFC), which has been studied most extensively as a power source for driving vehicles.

Figure 2:
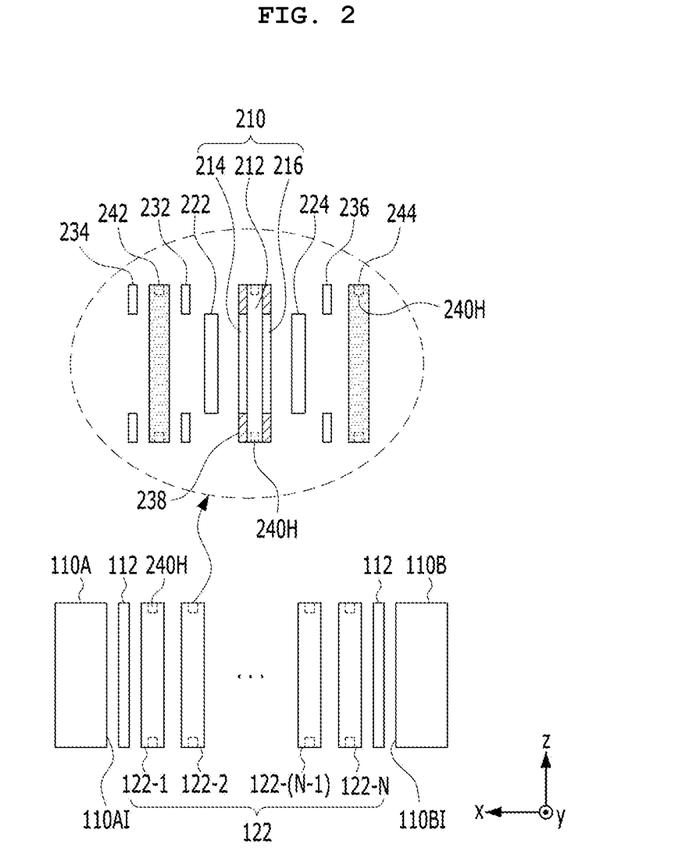
FIG. 2 is a cross-sectional view illustrating a fuel cell, which may be included in the vehicle shown in FIG. 1.

FIG. 2 is a cross-sectional view illustrating a fuel cell, which may be included in the vehicle 300A shown in FIG. 1.

Referring to FIG. 2, the fuel cell may include first and second end plates (pressing plates or compression plates) 110A and 110B, current collectors 112, and a cell stack 122. The cell stack 122 shown in FIG. 2 corresponds to an example of the cell stack 310 shown in FIG. 1.

The cell stack 122 may include a plurality of unit cells 122-1 to 122-N, which are stacked in a first direction (e.g., an x-axis direction). Here, "N" may be a positive integer of 1 or greater, and may range from several tens to several hundreds. "N" may range, for example, from 100 to 300, and may preferably be 220. However, the embodiment is not limited to any specific value of "N".

Each unit cell 122-$n$ (where $1 \leq n \leq N$) may generate 0.6 volts to 1.0 volts of electricity, on average 0.7 volts of electricity. Thus, "N" may be determined in accordance with the intensity of the power to be supplied from the fuel cell to a load. Here, "load" may refer to a part of the vehicle 300A that requires power, and specifically, may be a load end 380 or an inverter 390 shown in FIG. 1.

Each unit cell 122-$n$ may include a membrane electrode assembly (MEA) 210, gas diffusion layers (GDLs) 222 and 224, gaskets 232, 234 and 236, and separators (or bipolar plates) 242 and 244.

The membrane electrode assembly 210 may have catalyst electrode layers, in which an electrochemical reaction occurs, attached to both sides of an electrolyte membrane through which hydrogen ions move. Specifically, the membrane electrode assembly 210 may include a polymer electrolyte membrane (or a proton exchange membrane) 212, a fuel electrode (a hydrogen electrode or an anode) 214, and an air electrode (an oxygen electrode or a cathode) 216. In addition, the membrane electrode assembly 210 may further include a sub-gasket 238.

The polymer electrolyte membrane 212 may be disposed between the fuel electrode 214 and the air electrode 216.

Hydrogen, which is the fuel in the fuel cell, may be supplied to the fuel electrode 214 through the first separator 242, and air containing oxygen as an oxidizer may be supplied to the air electrode 216 through the second separator 244.

The hydrogen supplied to the fuel electrode 214 may be decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the gas diffusion layers 222 and 224 and the first and second separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell may generate power due to the electrochemical reaction between hydrogen, which is the fuel, and oxygen contained in the air.

In the air electrode 216, the hydrogen ions supplied through the polymer electrolyte membrane 212 and the electrons transferred through the first and second separators 242 and 244 meet oxygen in the air supplied to the air electrode 216, thus causing a reaction that generates water (hereinafter, referred to as "product water" or "condensate water"). The product water generated in the air electrode 216 may penetrate the polymer electrolyte membrane 212 and may be transferred to the fuel electrode 214.

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The first and second gas diffusion layers 222 and 224 serve to uniformly distribute hydrogen and oxygen, which are reactant gases, and to transfer the generated electric energy. To this end, the first and second gas diffusion layers 222 and 224 may be disposed on respective sides of the membrane electrode assembly 210. The first gas diffusion layer 222 may serve to diffuse and uniformly distribute hydrogen supplied as a reactant gas through the first separator 242, and may be electrically conductive. The second gas diffusion layer 224 may serve to diffuse and uniformly distribute air supplied as a reactant gas through the second separator 244, and may be electrically conductive.

The gaskets 232, 234 and 236 may serve to maintain the air-tightness and clamping pressure of the cell stack at an appropriate level with respect to the reactant gases and the coolant, to disperse the stress when the first and second separators 242 and 244 are stacked, and to independently seal the flow paths. As such, since air-tightness and water-tightness are maintained by the gaskets 232, 234 and 236, the flatness of the surfaces that are adjacent to the cell stack 122, which generates power, may be secured, and thus surface pressure may be distributed uniformly over the reaction surfaces of the cell stack 122.

The first and second separators 242 and 244 may serve to move the reactant gases and a cooling medium and to separate each of the unit cells from the other unit cells. In addition, the first and second separators 242 and 244 may serve to structurally support the membrane electrode assembly 210 and the gas diffusion layers 222 and 224 and to collect the generated current and transfer the collected current to the current collectors 112.

The first and second separators 242 and 244 may be spaced apart from each other in the first direction (e.g., the x-axis direction) and may be disposed outside the first and second gas diffusion layers 222 and 224, respectively. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. The second separator 244 serves to supply air as a reactant gas to the air electrode 216 through the second gas diffusion layer 224. In addition, each of the first and second separators 242 and 244 may form a channel through which the cooling medium (e.g., coolant) may flow.

Each of the first and second end plates 110A and 110B may be disposed at a respective one of both ends of the cell stack 122, and may support and fix the unit cells. That is, the first end plate 110A may be disposed at one end of the cell stack 122, and the second end plate 110B may be disposed at the opposite end of the cell stack 122.

Each of the first and second end plates 110A and 110B may be configured such that a metal insert is surrounded by a plastic injection-molded product. The metal insert of each of the first and second end plates 110A and 110B may have high rigidity to withstand internal surface pressure, and may be formed by machining a metal material.

The current collectors 112 may be disposed between the cell stack 122 and the inner surfaces 110AI and 110BI of the first and second end plates 110A and 110B that are opposite the cell stack 122. The current collectors 112 serve to collect the electric energy generated by the flow of electrons in the cell stack 122 and to supply the electric energy to a load of the vehicle 300A that uses the fuel cell.

Referring back to FIG. 1, the first DC/DC converter 320 converts the DC level of voltage (hereinafter, referred to as "stack voltage") generated and output from the cell stack 310 and outputs voltage having the converted DC level. For example, the first DC/DC converter 320 may boost the stack voltage and may output the boosted voltage. Although the first DC/DC converter 320 will be described below as increasing the DC level of the stack voltage, the following description may also be applied to a configuration in which the first DC/DC converter 320 decreases the DC level of the stack voltage.

In addition, the first DC/DC converter 320 may include a discharger 324 for removing residual energy thereof.

Figure 3:
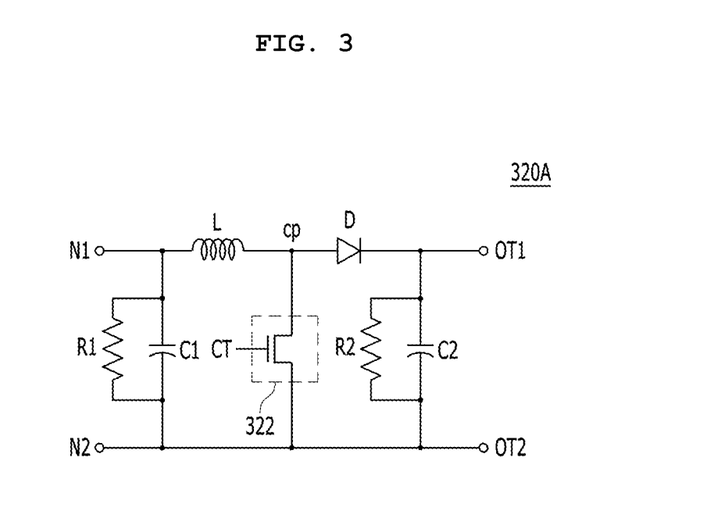
FIG. 3 is a circuit diagram of an example of a first direct current/direct current converter (DC/DC converter) shown in FIG. 1.

FIG. 3 is a circuit diagram of an example 320A of the first DC/DC converter 320 shown in FIG. 1.

The first DC/DC converter 320A shown in FIG. 3 may include an inductor L, a diode D, a switching device 322, first and second capacitors C1 and C2, and first and second discharge resistors R1 and R2.

The first DC/DC converter 320 or 320A shown in FIG. 1 or 3 may boost the stack voltage provided from the cell stack 310 and may output the result of boosting, i.e., the boosted voltage, to a power distributor 330A. The stack voltage corresponds to a potential difference between a first node N1 and a second node N2, which are output terminals of the cell stack 310, and the boosted voltage corresponds to the potential difference between a first output terminal OT1 and a second output terminal OT2 of the first DC/DC converter 320.

In one example, in the first DC/DC converter 320A, the inductor L is disposed between the first node N1 and a contact point CP, and the diode D includes an anode connected to the contact point CP and a cathode connected to the first output terminal OT1.

The first capacitor C1 and the first resistor R1 may be connected in parallel while being disposed between the first node N1 and the second node N2, and the second capacitor C2 and the second resistor R2 may be connected in parallel while being disposed between the first output terminal OT1 and the second output terminal OT2.

The switching device 322 may be implemented as a transistor, which is switched on in response to a switching control signal CT. For example, the switching device 322, as shown in the drawing, may be implemented as a power semiconductor device for switching, such as an insulated gate bipolar transistor (IGBT). The control signal CT may be output from the controller 350.

The first and second capacitors C1 and C2 shown in FIG. 3 may be implemented as smoothing capacitors. When the first DC/DC converter 320A is turned off, the residual energy, i.e., the residual voltage, remaining in the first capacitor C1 may be discharged and removed through the first resistor R1, and the residual energy, i.e., the residual voltage, remaining in the second capacitor C2 may be discharged and removed through the second resistor R2. That is, the first and second resistors R1 and R2 may correspond to one example of the discharger 324, which removes the residual energy from the first DC/DC converter 320.

Referring back to FIG. 1, the vehicle 300A may further include a cooling line 360 for cooling the first DC/DC converter 320.

Unlike a typical vehicle, the vehicle 300A including the fuel cell may include a fuel-cell-cooling loop dedicated to the fuel cell and an electronic-part-cooling loop. Here, the fuel-cell-cooling loop is a line along which coolant is supplied to the interior of the cell stack 310 of the fuel cell, in which a high voltage is formed, and the coolant supplied along the fuel-cell-cooling loop has very low electrical conductivity. The electronic-part-cooling loop is a line to which coolant is supplied to cool various high-voltage parts, and may correspond to the cooling line 360 for cooling the first DC/DC converter 320. The coolant supplied to the electronic-part-cooling loop corresponds to coolant of a typical vehicle, and is used to cool power electronic (PE) parts. The PE parts may be high-voltage parts, excluding a fuel cell, and may be, for example, the first DC/DC converter 320, the power distributor 330A, an air compressor, the inverter 390, and a motor 392.

In addition, the vehicle 300A may further include a cooler 362 and a pump 364. The cooler 362 corresponds to a radiator or a fan, and the pump 364 serves to circulate the coolant in the cooling line 360 in the direction indicated by the arrow.

Figure 4:
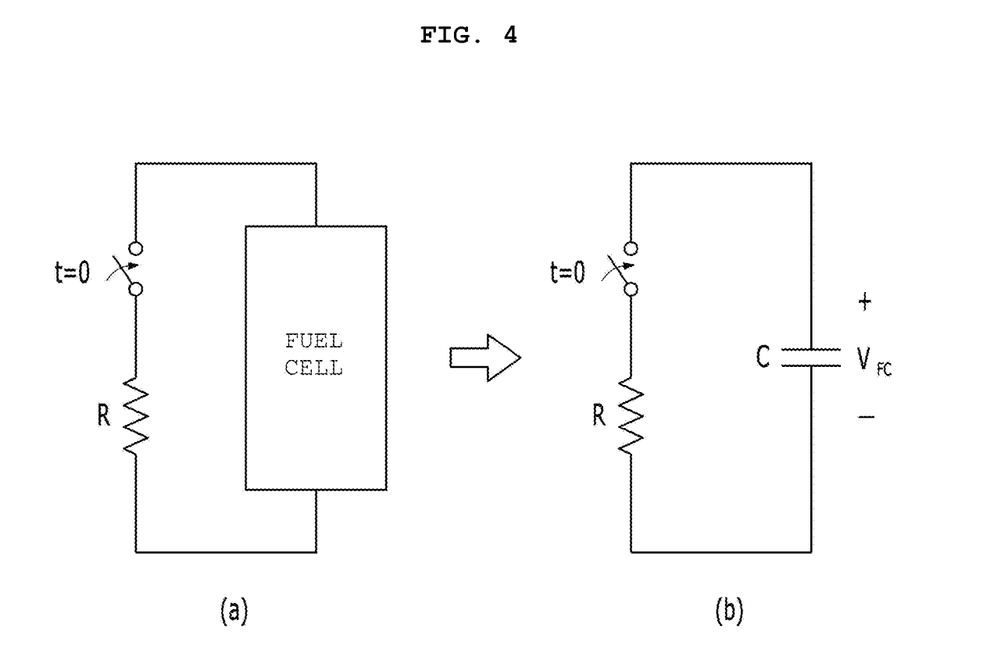
FIG. 4 is a view for explaining discharge of the fuel cell.

FIG. 4 is a view for explaining the discharge of the fuel cell. FIG. 4(b) is an equivalent circuit of the fuel cell shown in FIG. 4(a).

Figure 5:
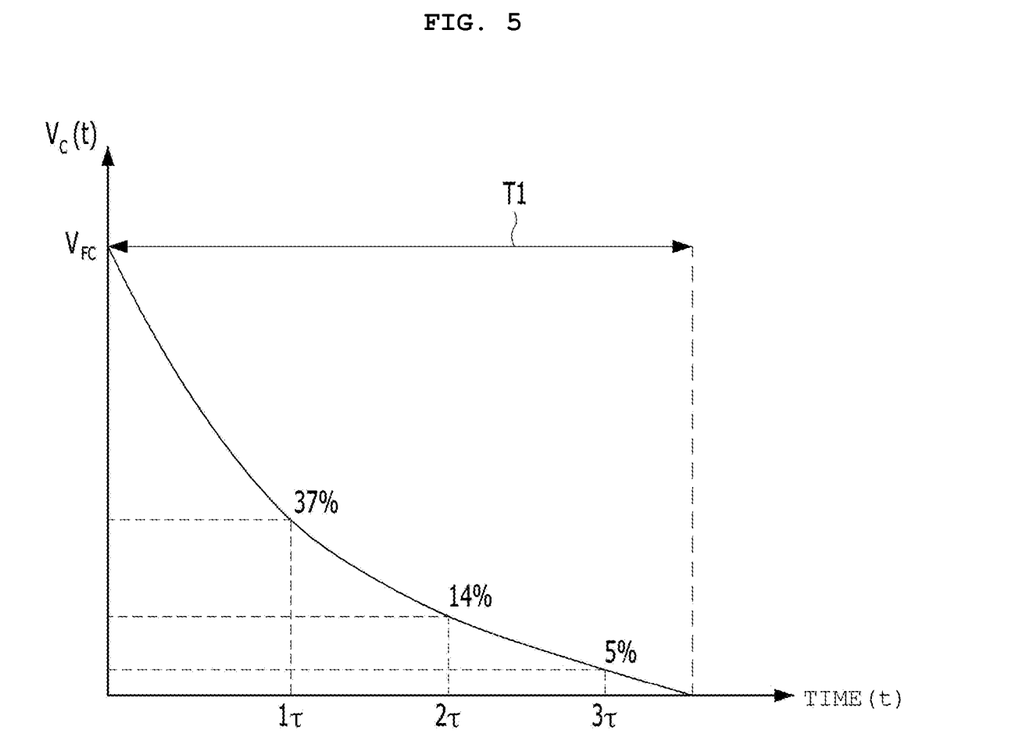
FIG. 5 is a graph for explaining a discharge time.

FIG. 5 is a graph for explaining a discharge time, in which the vertical axis denotes the voltage and the horizontal axis denotes the time.

The time constant T of the circuit shown in FIG. 4 may be calculated using the following Equation 1.

$$\frac{dv_c(t)}{dt} + \frac{v_c(t)}{RC} = 0 \quad \text{[Equation 1]}$$

$$v_c = V_{FC} \cdot e^{-\frac{t}{RC}}$$

$$\tau = RC$$

Referring to FIG. 5, it can be seen that the discharge time T1 is proportional to the magnitude of the discharge resistance R and the magnitude of the capacitor C of the power source.

Typically, the resistance values of the first and second resistors R1 and R2 included in the first DC/DC converter 320 may range from several kiloohms (kΩ) to several tens of kiloohms (kΩ). As such, when the resistance values of the first and second resistors R1 and R2 are large, as described above with reference to FIGS. 4 and 5, it may take a large amount of time to discharge the residual voltages charged in the first and second capacitors C1 and C2. Therefore, according to an exemplary embodiment, when the amount of residual electric energy to be discharged is large and it is desired to rapidly discharge the residual electric energy by shortening the discharge time, it may be required to decrease the resistance values of the first and second resistors R1 and R2. However, the decrease in the resistance values may cause an increase in the level of the discharged current, and thus, the first and second resistors R1 and R2 may generate a larger amount of heat. Therefore, the first and second resistors R1 and R2 may be disposed in the cooling line 360 so as to dissipate the heat generated by the first and second resistors R1 and R2.

As described above, when the resistance value of the discharger 324 decreases, the discharge time may be reduced. In addition, when the discharger 324 is disposed in the cooling line 360, the heat generated by the discharger 324 may be cooled by the coolant in the cooling line 360.

Therefore, the resistance value of the discharger 324 may be determined depending on the magnitude of residual electric energy in the cell stack 310 of the fuel cell and the first DC/DC converter 320 and an amount of time required to complete the discharge.

According to an exemplary embodiment of the present disclosure, the resistance value of the discharger 324 may be 1Ω to 100Ω, preferably 1Ω to 10Ω, and more preferably 2Ω or 8Ω, but the embodiment is not limited thereto.

The discharger 324 shown in FIG. 1 may be implemented as the first and second resistors R1 and R2 shown in FIG. 3, but the embodiment is not limited thereto. According to another exemplary embodiment, the discharger 324 may be implemented as a resistance heater such as a sheath heater or a ceramic heater.

The power distributor 330A may be a sort of a high-voltage junction box that serves to distribute the power generated by the cell stack 310. For example, the power distributor 330A may include a fuse and a relay to control peripheral auxiliary components (balance-of-plant (BOP)) assisting in the operation of the fuel cell.

In response to first control signals C1 output from the controller 350, the power distributor 330A may distribute the level-converted voltage output from the first DC/DC converter 320 to the PE parts or may provide the voltage remaining in the cell stack 310 to the discharger 324 in order to discharge the residual voltage. According to an exemplary embodiment, the voltage remaining the cell stack 310 may be discharged by providing the level-converted voltage from the first DC/DC converter 320 to the discharger 324.

The power distributor 330A may include a first switching unit (or a first relay unit) and a second switching unit (or a second relay unit).

The first switching unit may form a first path along which the level-converted voltage output from the first DC/DC converter 320 is supplied to the battery 340 or the loads 380 and 390 depending on the level of a 1-$1^{st}$ control signal C11, which is one of the first control signals C1. For example, the first switching unit may include first and second switches (or relays) S1 and S2.

The first switch S1 may be disposed in a first line L1 interconnecting the first output terminal OT1 of the first DC/DC converter 320, the battery 340, and the loads 380 and 390, and may be switched on or off depending on the level of the 1-$1^{st}$ control signal C11. The second switch S2 may be disposed in a second line L2 interconnecting the second output terminal OT2 of the first DC/DC converter 320, the battery 340, and the loads 380 and 390, and may be switched on or off depending on the level of the 1-$1^{st}$ control signal C11.

For example, when the 1-$1^{st}$ control signal C11 having a "high" level (e.g., 12 volts) is supplied from the controller 350, all of the first and second switches S1 and S2 may be switched on, and thus the first path, along which the level-converted voltages output from the first and second output terminals OT1 and OT2 are supplied to the battery 340 and the loads 380 and 390, may be formed. On the other hand, when the 1-$1^{st}$ control signal C11 having a "low" level (e.g., 0 volt) is supplied from the controller 350, all of the first and second switches S1 and S2 may be switched off, and thus the first path, along which the level-converted voltages output from the first and second output terminals OT1 and OT2 are supplied to the battery 340 and the loads 380 and 390, may be blocked.

Alternatively, the first switching unit may form the first path, along which the level-converted voltage output from the first DC/DC converter 320 is supplied to the battery 340 and the loads 380 and 390, based on whether the 1-$1^{st}$ control signal C11, which is one of the first control signals C1, is being generated. In this case, the first switching unit may also include first and second switches S1 and S2.

The first switch S1 may be disposed in the first line L1 and may be switched on or off based on whether the 1-$1^{st}$ control signal C11 is being generated. The second switch S2 may be disposed in the second line L2 and may be switched on or off based on whether the 1-$1^{st}$ control signal C11 is being generated.

For example, when the 1-$1^{st}$ control signal C11 is generated from the controller 350, all of the first and second switches S1 and S2 may be switched on, and thus the first path, along which the level-converted voltages output from the first and second output terminals OT1 and OT2 are supplied to the battery 340 and the loads 380 and 390, may be formed. On the other hand, when the 1-$1^{st}$ control signal C11 is not generated from the controller 350, all of the first and second switches S1 and S2 may be switched off, and thus the first path, along which the level-converted voltages output from the first and second output terminals OT1 and OT2 are supplied to the battery 340 and the loads 380 and 390, may be blocked. As such, as long as the 1-$1^{st}$ control signal C11 is generated, the first and second switches S1 and S2 may be switched on irrespective of the level of the 1-$1^{st}$ control signal C11.

The second switching unit may form a second path, along which the voltage remaining in the cell stack 310 is provided to the discharger 324, depending on the level of a 1-$2^{nd}$ control signal C12, which is another one of the first control signals C1. Alternatively, the second switching unit may form a second path, along which the voltage remaining in the cell stack 310 is provided to the discharger 324, depending on whether the 1-$2^{nd}$ control signal C12 is being generated. In this case, the level-converted voltage output from the first DC/DC converter 320 may be provided to the discharger 324, and thus the second path, along which the voltage remaining in the cell stack 310 is provided to the discharger 324, may be formed. However, the embodiment is not limited thereto. According to another exemplary embodiment, the stack voltage may be directly provided to the discharger 324 depending on whether the 1-$2^{nd}$ control signal C12 is being generated or depending on the level of the 1-$2^{nd}$ control signal C12.

Figure 6:
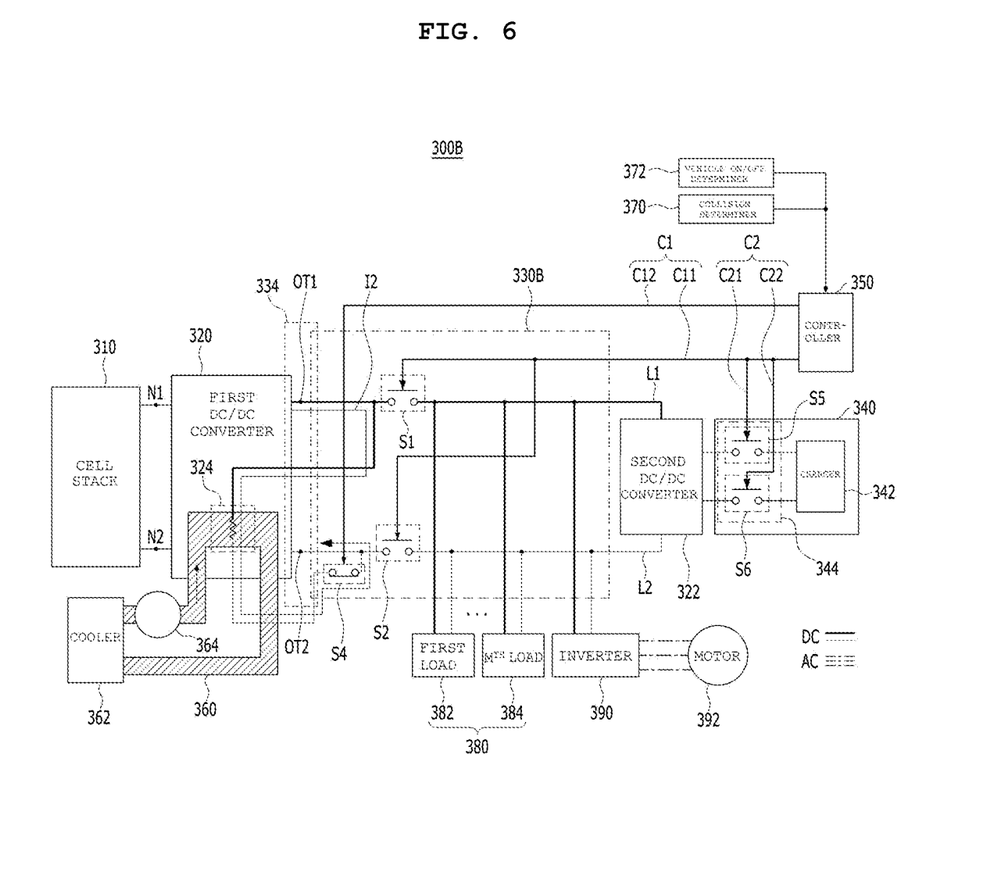
FIG. 6 is a block diagram of a vehicle including a fuel cell according to another exemplary embodiment of the present disclosure.

FIG. 6 is a block diagram of a vehicle 300B including a fuel cell according to another exemplary embodiment of the present disclosure.

The power distributor 330A of the vehicle 300A shown in FIG. 1 includes a third switch S3, whereas the power distributor 330B of the vehicle 300B shown in FIG. 6 includes a fourth switch S4, rather than the third switch S3. Except therefor, the vehicle 300B shown in FIG. 6 has the same configuration as the vehicle 300A shown in FIG. 1, and thus the components in FIG. 6 that are the same as the components in FIG. 1 are denoted by the same reference numerals. Therefore, the description of the vehicle 300A shown in FIG. may be applied to the vehicle 300B shown in FIG. 6, excluding the fourth switch S4, and a duplicate explanation will be omitted.

According to an exemplary embodiment of the present disclosure, the second switching unit of the vehicle 300A shown in FIG. 1 may include a third switch S3. The third switch S3 may interconnect the first output terminal OT1 of the first DC/DC converter 320 and one end of the discharger 324 while being located therebetween, and may be switched on or off depending on whether the 1-$2^{nd}$ control signal C12 is being generated. In this case, the opposite end of the discharger 324 may be connected to the second output terminal OT2 of the first DC/DC converter 320.

According to another exemplary embodiment of the present disclosure, the second switching unit of the vehicle 300B shown in FIG. 6 may include a fourth switch S4. The fourth switch S4 may interconnect the second output terminal OT2 of the first DC/DC converter 320 and the opposite end of the discharger 324 while being located therebetween, and may be switched on or off depending on whether the $1\text{-}2^{nd}$ control signal C12 is being generated. In this case, the one end of the discharger 324 may be connected to the first output terminal OT1 of the first DC/DC converter 320.

For example, when the $1\text{-}2^{nd}$ control signal C12 is not generated from the controller 350, the third or fourth switch S3 or S4 may be switched on, and thus the second path, along which the voltage remaining in the cell stack 310 is provided to the discharger 324, may be formed. In this case, when the second path is formed, current I1 or I2 may flow in the direction indicated by the arrow in the vehicle 300A or 300B shown in FIG. 1 or 6.

On the other hand, when the $1\text{-}2^{nd}$ control signal C12 is generated from the controller 350, the third or fourth switch S3 or S4 may be switched off, and thus the second path, along which the voltage remaining in the cell stack 310 is provided to the discharger 324, may be blocked. As such, as long as the $1\text{-}2^{nd}$ control signal C12 is generated, the third or fourth switch S3 or S4 may be switched off irrespective of whether the level of the $1\text{-}2^{nd}$ control signal C12 is a "high" level or a "low" level. When the $1\text{-}2^{nd}$ control signal C12 is not generated, the third or fourth switch S3 or S4 may be switched on.

Alternatively, when the $1\text{-}2^{nd}$ control signal C12 having a "high" level (e.g., 12 volts) is generated from the controller 350, the third or fourth switch S3 or S4 may be switched on, and thus the second path, along which the voltage remaining in the cell stack 310 is provided to the discharger 324, may be formed. On the other hand, when the $1\text{-}2^{nd}$ control signal C12 having a "low" level is generated from the controller 350, the third or fourth switch S3 or S4 may be switched off, and thus the second path, along which the voltage remaining in the cell stack 310 is provided to the discharger 324, may be blocked.

In addition, the controller 350 may determine whether the vehicle is traveling normally, and may generate the first control signals C1, i.e., the $1\text{-}1^{st}$ and $1\text{-}2^{nd}$ control signals C11 and C12, depending on the determination result.

For example, upon determining that the vehicle is traveling normally, the controller 350 may generate the $1\text{-}1^{st}$ control signal C11 having a "high" level and may generate the $1\text{-}2^{nd}$ control signal C12 having a "low" level. Upon determining that the vehicle is not traveling normally, the controller 350 may generate the $1\text{-}1^{st}$ control signal C11 having a "low" level and may generate the $1\text{-}2^{nd}$ control signal C12 having a "high" level.

Alternatively, upon determining that the vehicle is traveling normally, the controller 350 may generate the $1\text{-}1^{st}$ control signal C11 and the $1\text{-}2^{nd}$ control signal C12. Upon determining that the vehicle is not traveling normally, the controller 350 may stop generating the $1\text{-}1^{st}$ control signal C11 and may stop generating the $1\text{-}2^{nd}$ control signal C12.

The vehicle 300A or 300B including the fuel cell according to an exemplary embodiment may include at least one of a vehicle ON/OFF determiner 372 or a collision determiner 370.

The vehicle ON/OFF determiner 372 may determine whether the vehicle 300A or 300B has been turned off (or has shut down), and may output the determination result to the controller 350. In this case, the controller 350 may determine whether to generate the $1\text{-}1^{st}$ and $1\text{-}2^{nd}$ control signals C11 and C12 or may determine the levels of the $1\text{-}1^{st}$ and $1\text{-}2^{nd}$ control signals C11 and C12, based on the determination result from the vehicle ON/OFF determiner 372.

The collision determiner 370 may determine whether the vehicle 300A or 300B has been involved in a collision, and may output the determination result to the controller 350. In this case, the controller 350 may determine whether to generate the $1\text{-}1^{st}$ and $1\text{-}2^{nd}$ control signals C11 and C12 or may determine the levels of the $1\text{-}1^{st}$ and $1\text{-}2^{nd}$ control signals C11 and C12, based on the determination result from the collision determiner 370.

That is, when at least one of the vehicle ON/OFF determiner 372 or the collision determiner 370 determines that the vehicle 300A or 300B has been turned off or that the vehicle 300A or 300B has been involved in a collision, the controller 350 may determine that the vehicle 300A or 300B is not traveling normally.

In addition, the vehicle 300A or 300B according to an exemplary embodiment may further include a battery 340. The battery 340 may be charged with the voltage distributed by the power distributor 330A or 330B depending on the levels of the second control signals C2. Alternatively, the battery 340 may be charged with the voltage distributed by the power distributor 330A or 330B depending on whether the second control signals C2 are being generated. To this end, the controller 350 may generate the second control signals C2 depending on whether the vehicle 300A or 300B is traveling normally.

According to an exemplary embodiment of the present disclosure, the battery 340 may include a charger 342 and a third switching unit (or a relay unit) 344. The charger 342 may be charged with the voltage distributed by the power distributor 330A or 330B.

The third switching unit 344 may form a third path, along which the voltage is charged in the charger 342, depending on the levels of the second control signals C2. Alternatively, the third switching unit 344 may form the third path, along which the voltage is charged in the charger 342, depending on whether the second control signals C2 are being generated. To this end, the third switching unit 344 may include fifth and sixth switches (or relays) S5 and S6.

The fifth switch S5 may be disposed between the first line L1 and the charger 342, and may be switched on or off, depending on whether a $2\text{-}1^{st}$ control signal C21, which is one of the second control signals, is being generated or depending on the level of the $2\text{-}1^{st}$ control signal C21. The sixth switch S6 may be disposed between the second line L2 and the charger 342, and may be switched on or off depending on whether a $2\text{-}2^{nd}$ control signal C22, which is another one of the second control signals, is being generated or depending on the level of the $2\text{-}2^{nd}$ control signal C22.

For example, the fifth switch S5 may be switched on when the $2\text{-}1^{st}$ control signal C21 has a "high" level or when the $2\text{-}1^{st}$ control signal C21 is generated, and the sixth switch S6 may be switched on when the $2\text{-}2^{nd}$ control signal C22 has a "high" level or when the $2\text{-}2^{nd}$ control signal C22 is generated, thereby forming the third path.

On the other hand, the fifth switch S5 may be switched off when the $2\text{-}1^{st}$ control signal C21 has a "low" level or when the $2\text{-}1^{st}$ control signal C21 is not generated, and the sixth switch S6 may be switched off when the $2\text{-}2^{nd}$ control signal C22 has a "low" level or when the $2\text{-}2^{nd}$ control signal C22 is not generated, thereby blocking the third path.

That is, according to an exemplary embodiment, as long as the $2\text{-}1^{st}$ and $2\text{-}2^{nd}$ control signals C21 and C22 are generated, the fifth and sixth switches S5 and S6 may be switched on irrespective of the levels of the 2-1$^{st}$ and 2-2$^{nd}$ control signals C21 and C22. In addition, when the 2-1$^{st}$ and 2-2$^{nd}$ control signals C21 and C22 are not generated, the fifth and sixth switches S5 and S6 may be switched off.

To this end, upon determining that the vehicle 300A or 300B is traveling normally, the controller 350 may generate the 2-1$^{st}$ control signal C21 having a "high" level and the 2-2$^{nd}$ control signal C22 having a "high" level. Upon determining that the vehicle 300A or 300B is not traveling normally, the controller 350 may generate the 2-1$^{st}$ control signal C21 having a "low" level and the 2-2$^{nd}$ control signal C22 having a "low" level.

Alternatively, upon determining that the vehicle 300A or 300B is traveling normally, the controller 350 may generate the 2-1$^{st}$ control signal C21 and the 2-2$^{nd}$ control signal C22. Upon determining that the vehicle 300A or 300B is not traveling normally, the controller 350 may stop generating the 2-1$^{st}$ control signal C21 and the 2-2$^{nd}$ control signal C22.

The controller 350 may intentionally stop generating the first and second control signals C1 and C2, or may unintentionally stop generating the first and second control signals C1 and C2 due to, for example, a collision.

The vehicle 300A or 300B may further include a load end 380, an inverter 390, and a motor 392. The load end 380 may include first to M$^{th}$ loads 382 to 384. Here, "M" may be a positive integer of 1 or greater. Each of the first to M$^{th}$ loads may include various parts necessary for driving of the vehicle, such as a motor-driven power steering (MDPS), a radiator fan, and a headlight which are not shown. To this end, each of the first to M$^{th}$ loads 382 to 384 may be driven by receiving drive voltage having a constant magnitude from the power distributor 330A or 330B.

The inverter 390 may convert direct-current (DC) voltage of the cell stack 310 into alternating-current (AC) voltage and may supply the AC voltage to the motor 392 depending on the driving state of the vehicle 300A or 300B.

The motor 392 may serve to receive AC voltage for a motor from the inverter 390 and to rotate, in order to drive the vehicle 300A or 300B. For example, the motor 392 may be a three-phase AC motor, which includes a rotor in which a permanent magnet is installed. However, the embodiment is not limited to any specific form of the motor.

In addition, the vehicle 300A or 300B may further include a second DC/DC converter 322. The second DC/DC converter 322 may convert the DC level of the power (e.g., a voltage) charged in the battery 340 to a desired level, and may output the level-converted voltage to the power distributor 330A or 330B. In this case, the power distributor 330A or 330B may provide the voltages having levels converted by the first and second DC/DC converters 320 and 322 to at least one of the load end 380 or the inverter 390. For example, when the voltage charged in the battery 340 is boosted, the second DC/DC converter 322 may be implemented as illustrated in FIG. 3.

For example, when 100 kW of power and 400 volts of stack voltage are provided from the cell stack 310, when the battery 340 is charged with 50 kW of power and 300 volts of voltage, and when 150 kW of power and 800 volts of voltage are required by corresponding ones of the first to M$^{th}$ loads 382 to 384, the first DC/DC converter 320 may boost 100 kW of power and 400 volts of stack voltage to 800 volts, the second DC/DC converter 322 may boost 50 kW of power and 300 volts of charged voltage to 800 volts, and the boosted voltages may be provided to the corresponding loads via the power distributor 330A or 330B.

Alternatively, the second DC/DC converter 322 may be omitted. In this case, the first line L1 may be directly connected to the fifth switch S5, and the second line L2 may be directly connected to the sixth switch S6.

For example, when 100 kW of power and 400 volts of stack voltage are provided from the cell stack 310, when the battery 340 is charged with 50 kW of power and 800 volts of voltage, and when 150 kW of power and 800 volts of voltage are required by corresponding ones of the first to M$^{th}$ loads 382 to 384, the first DC/DC converter 320 may boost 100 kW of power and 400 volts of stack voltage to 800 volts, and the boosted voltage and the charged voltage may be provided to the corresponding loads via the power distributor 330A or 330B.

The first DC/DC converter 320 and the power distributor 330A or 330B may be directly and electrically connected to each other (refer to "334" in FIG. 1 or 6).

Figure 7:
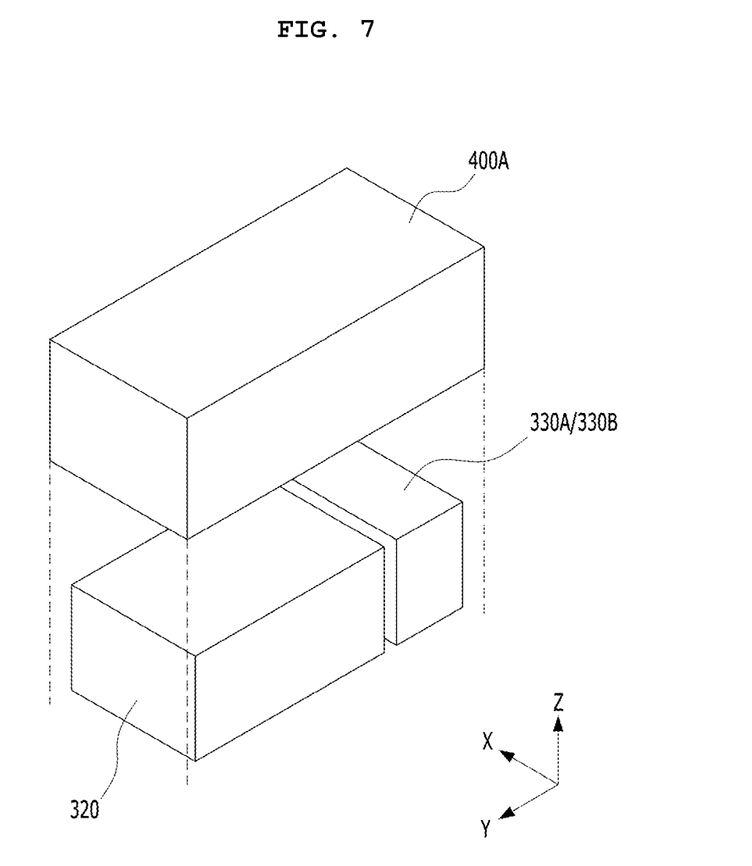
FIG. 7 is a perspective view of the external appearance of one example of the vehicle.
Figure 8:
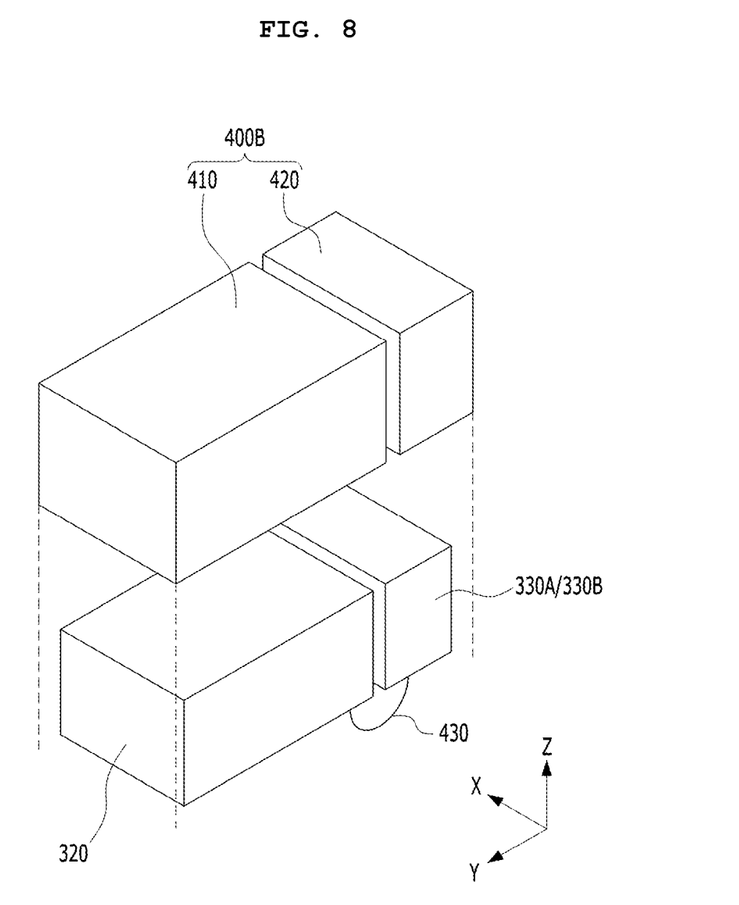
FIG. 8 is a perspective view of the external appearance of another example of the vehicle.

FIG. 7 is a perspective view of the external appearance of one example of the vehicle 300A or 300B, and FIG. 8 is a perspective view of the external appearance of another example of the vehicle 300A or 300B.

As shown in FIGS. 7 and 8, the vehicle 300A or 300B may include a case. The case may accommodate the first DC/DC converter 320 and the power distributor 330A or 330B.

The case 400A shown in FIG. 7 is of an integrated type that accommodates all of the first DC/DC converter 320 and the power distributor 330A or 330B. In this case, the first DC/DC converter 320 and the power distributor 330A or 330B may be directly connected to each other.

Alternatively, the case 400B shown in FIG. 8 may include first and second cases 410 and 420. The first case 410 may accommodate the first DC/DC converter 320, and the second case 420 may accommodate the power distributor 330A or 330B. That is, the case 400B shown in FIG. 8 is of a separate type that separately accommodates the first DC/DC converter 320 and the power distributor 330A or 330B. In this case, the vehicle 300A or 300B may further include a wire 430 for electrically connecting the first DC/DC converter 320 and the power distributor 330A or 330B to each other. The location at which the wire 430 is disposed is not limited to the location shown in FIG. 8.

Hereinafter, a residual energy discharge method 500 according to an exemplary embodiment, which is performed in the vehicle 300A or 300B including the fuel cell, will be described with reference to the accompanying drawings.

Figure 9:
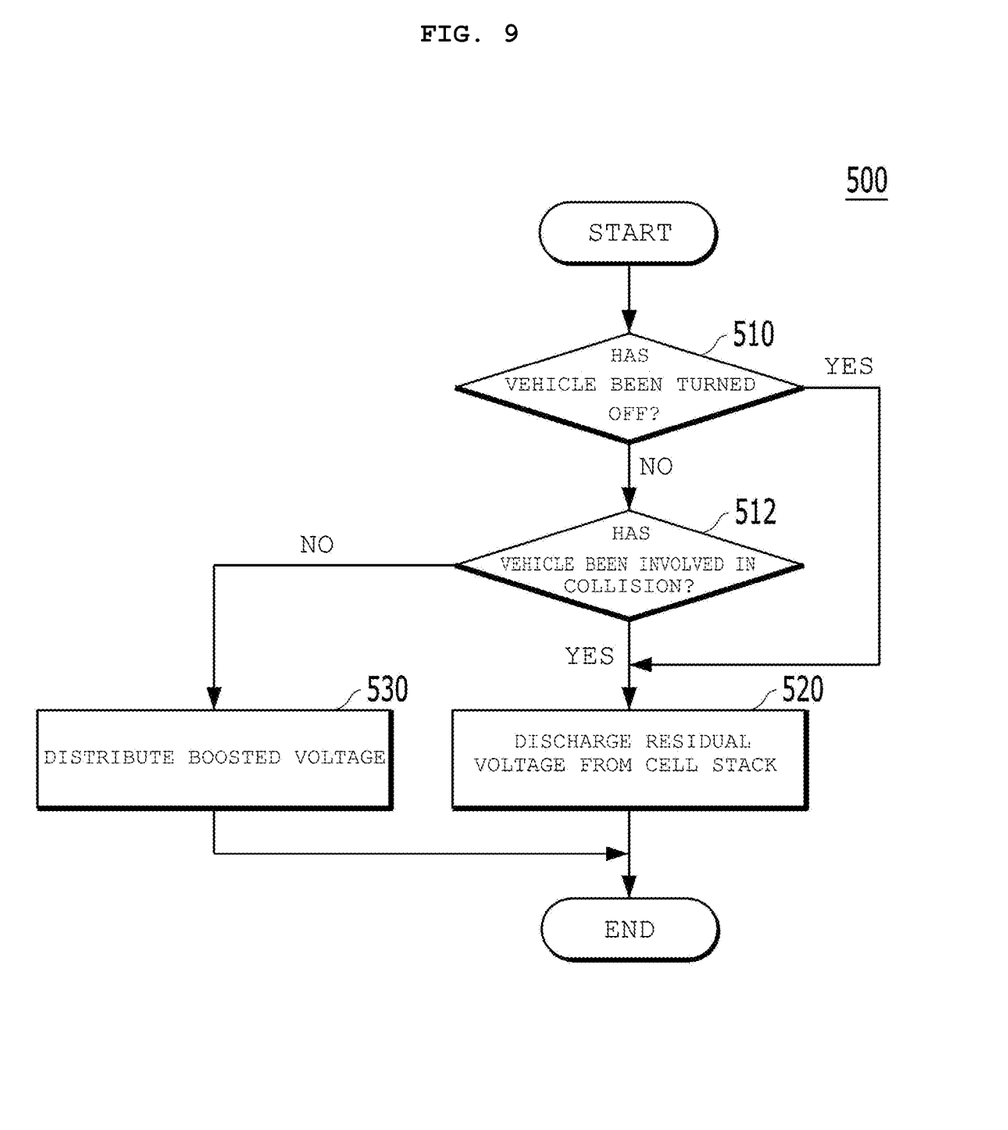
FIG. 9 is a flowchart for explaining a residual energy discharge method according to an exemplary embodiment of the present disclosure.

FIG. 9 is a flowchart for explaining a residual energy discharge method 500 according to an exemplary embodiment of the present disclosure.

The residual energy discharge method 900 shown in FIG. 9 may be performed in the vehicle 300A or 300B shown in FIG. 1 or 6, but the embodiment is not limited thereto. That is, the vehicle 300A or 300B shown in FIG. 1 or 6 may perform a residual energy discharge method different from the method shown in FIG. 9, and the residual energy discharge method 500 shown in FIG. 9 may be performed in a vehicle having a configuration different from the configuration of the vehicle 300A or 300B shown in FIG. 1 or 6.

According to the residual energy discharge method 900, it is determined whether the vehicle 300A or 300B is traveling normally (steps 510 and 512).

For example, the step of determining whether the vehicle 300A or 300B is traveling normally may include at least one of a step of determining whether the vehicle 300A or 300B has been turned off (step 510) or a step of determining whether the vehicle 300A or 300B has been involved in a collision.

According to an exemplary embodiment of the present disclosure, as shown in FIG. 9, it is determined whether the vehicle 300A or 300B has been turned off (step 510). When it is determined that the vehicle 300A or 300B is not turned off, it is determined whether the vehicle 300A or 300B has been involved in a collision (step 512).

According to another exemplary embodiment of the present disclosure, unlike the procedure shown in FIG. 9, it is first determined whether the vehicle 300A or 300B has been involved in a collision (step 512). When it is determined that the vehicle 300A or 300B has not been involved in a collision, it is determined whether the vehicle 300A or 300B has been turned off (step 510).

Step 510 may be performed by the vehicle ON/OFF determiner 372, and step 512 may be performed by the collision determiner 370.

When it is determined that the vehicle 300A or 300B is traveling normally, that is, when it is determined that the vehicle 300A or 300B is not turned off and when it is determined that the vehicle 300A or 300B has not been involved in a collision, the level-converted voltage is distributed to the PE parts (step 530). Step 530 may be performed by the controller 350 and the power distributor 330A or 330B.

On the other hand, when it is determined that the vehicle 300A or 300B is not traveling normally, the voltage remaining in the cell stack 310 is provided to the discharger 324 and is discharged (step 520). That is, when the vehicle 300A or 300B is turned off or is involved in a collision, it may be determined that the vehicle 300A or 300B is not traveling normally, and step 520 may be performed.

Step 520 may be performed by the controller 350, the power distributor 330A or 330B, and the discharger 324.

Hereinafter, a vehicle 10 according to a comparative example and the vehicle 300A or 300B according to the embodiment will be described with reference to the accompanying drawings.

Figure 10:
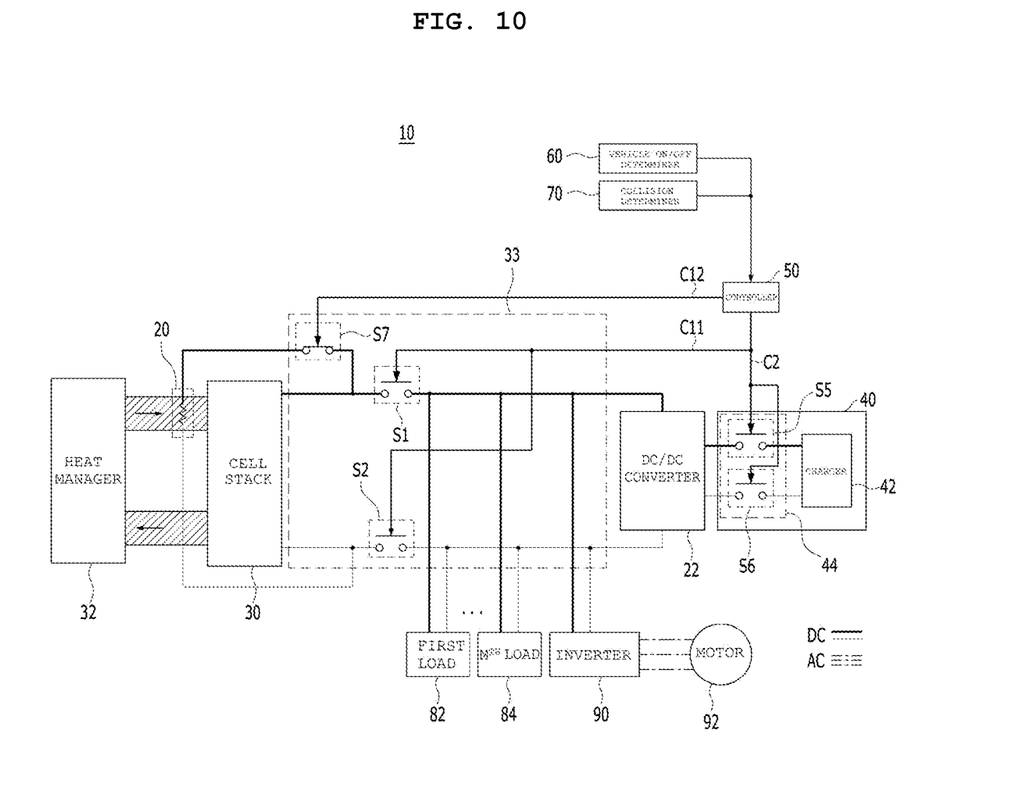
FIG. 10 is a block diagram of a vehicle according to a comparative example.

FIG. 10 is a block diagram of a vehicle 10 according to a comparative example, which may include a heat manager 32, a cell stack 30, a power distributor 33, a DC/DC converter 22, a battery 40, a controller 50, a vehicle ON/OFF determiner 60, a collision determiner 70, first to $M^{th}$ loads 82 to 84, an inverter 90, and a motor 92.

The cell stack 30, the DC/DC converter 22, the battery 40, the vehicle ON/OFF determiner 60, the collision determiner 70, the first to $M^{th}$ loads 82 to 84, the inverter 90, and the motor 92 of the vehicle 10 shown in FIG. 10 may correspond to the cell stack 310, the second DC/DC converter 322, the battery 340, the vehicle ON/OFF determiner 372, the collision determiner 370, the first to $M^{th}$ loads 382 to 384, the inverter 390, and the motor 392 of the vehicle 300A or 300B shown in FIG. 1 or 6, respectively. Thus, a charger 42 and a switching unit 44 of the battery 40 correspond to the charger 342 and the third switching unit 344 of the battery 340 shown in FIG. 1 or 6, respectively. In addition, first and second switches S1 and S2 of the power distributor 33 correspond to the first and second switches S1 and S2 of the power distributor 330A or 330B shown in FIG. 1 or 6, respectively. Therefore, among the components shown in FIG. 10, a duplicate explanation of the same components as those shown in FIG. 1 or 6 will be omitted.

The heat manager 32 serves to manage heat generated from the cell stack 30 by, for example, supplying coolant to the cell stack 30 in the direction indicated by the arrow.

The vehicle 10 shown in FIG. 10 may further include a cathode oxygen depletion (COD) heater 20 disposed in a line along which the coolant is supplied. The power distributor 33 may include a seventh switch (or a relay) S7, which is switched on or off in a different manner from the third switch S3 of the power distributor 330A or 330B shown in FIG. 1 or 6.

When it is determined that the vehicle 10 is traveling normally, the controller 50 may generate a $1$-$1^{st}$ control signal C11 having a "high" level such that all of the first and second switches S1 and S2 are switched on, may generate a second control signal C2 having a "high" level such that all of the fifth and sixth switches S5 and S6 are switched on, and may generate a $1$-$2^{nd}$ control signal C12 having a "low" level such that the seventh switch S7 is switched off. Thus, the stack voltage output from the cell stack 30 may be provided to the power distributor 33, the power distributor 33 may supply the stack voltage to the DC/DC converter 22 and the loads 82 to 84 and 90, and the battery 40 may be charged with the output from the DC/DC converter 22.

On the other hand, when it is determined that the vehicle 10 is not traveling normally, the controller 50 may generate a $1$-$1^{st}$ control signal C11 having a "low" level such that all of the first and second switches S1 and S2 are switched off, may generate a second control signal C2 having a "low" level such that all of the fifth and sixth switches S5 and S6 are switched off, and may generate a $1$-$2^{nd}$ control signal C12 having a "high" level (e.g., 12 volts) such that the seventh switch S7 is switched on. When the seventh switch S7 is switched on, the stack voltage output from the cell stack 30 may not be provided to the power distributor 33, but may be provided to the COD heater 20 along the path formed by the seventh switch S7, which is switched on. In this case, the electric energy remaining in the cell stack 30 may be discharged and consumed using a resistance heating element of the COD heater 20 as a discharge resistance, thereby reducing the magnitude of residual voltage in the cell stack 30 to a predetermined level or less.

The COD heater 20 is a resistance heating device for consuming residual oxygen present in the air channel during startup (S/U) or shutdown (S/D) of the cell stack 30 in order to improve the durability of the fuel cell. The COD heater 20 serves to consume residual oxygen in the cell stack 30, i.e., to discharge residual voltage from the cell stack 30, when the normally traveling vehicle 10 is turned off or when the vehicle 10 is involved in a collision.

However, in the case of the vehicle 10 according to the comparative example described above, when the vehicle 10 is involved in a collision, the switch S7 for the COD heater 20 may not be switched on due to deformation of an engine compartment. For example, in the event of a collision of vehicle 10, the controller 50 may be damaged, the signal line interconnecting the controller 50 and the seventh switch S7 may be damaged, or the 12-volt battery and the relevant wiring may be damaged. In this case, the $1$-$2^{nd}$ control signal C12 and the 12-volt power may not be secured, and thus the seventh switch S7 may not be switched on. As such, when the controller 50 is incapable of generating a 12-volt $1$-$2^{nd}$ control signal C12, the seventh switch S7 may not be switched on despite the situation in which the vehicle 10 is involved in a collision or is turned off, thus leading to failure to discharge residual energy from the cell stack 30.

On the other hand, in the case of the vehicle 300A or 300B according to an exemplary embodiment, when the controller 350 is incapable of generating a 12-volt $1$-$2^{nd}$ control signal C12 due to a collision of the vehicle 300A or 300B, the third switch S3 may be switched on, and thus residual energy may be discharged by the discharger 324. Therefore, in the case of the vehicle 300A or 300B according to an exemplary embodiment, when the vehicle 300A or 300B is turned off, oxygen in the air channel of the cell stack 310 may be removed, and thus the durability of the cell stack 310 may be improved. In addition, in the event of a collision of the vehicle 300A or 300B, residual voltage in the cell stack 310 may be discharged and removed, and thus an electric shock or an electrical fire may be prevented, i.e., electrical stability may be secured.

The COD heater 20 described above may serve as a braking resistor that consumes electricity generated from the motor 92 by inertia and thus prevents overcharging of the high-voltage battery. Further, the COD heater 20 may serve as a load that increases the temperature of the cell stack 30, i.e., warms up the cell stack 30, in the fuel cell by heating coolant using a heating element and thus stabilizes the output performance of the fuel cell, and that enables the cell stack 30 to increase in temperature using the heat of reaction thereof.

However, the vehicle 10 may not require a warm-up function or a braking resistance function depending on the characteristics thereof. For example, like commercial vehicles (e.g., buses or trucks), when a cold start time does not need to be shortened, when a high-voltage battery is capable of substituting for the role of the cell stack 30 as a load for increasing the temperature because the capacity thereof is larger than the capacity of a battery of a car, or when a separate braking resistor having a large capacity is provided, the function of the COD heater 20 may be reduced. Nevertheless, the vehicle 10 according to the comparative example requires the COD heater 20 in order to reduce the residual energy in the cell stack 30.

However, since the vehicle 300A or 300B including the fuel cell according to an exemplary embodiment is capable of discharging energy (e.g., a voltage) remaining in the cell stack using the discharger 324, which is originally provided in the first DC/DC converter 320 to remove residual energy in the converter 320, it does not require a COD heater 20. Therefore, compared to the vehicle 10 according to the comparative example, the vehicle 300A or 300B according to an exemplary embodiment has the effects of reducing the manufacturing costs thereof, simplifying the configuration thereof, reducing the volume thereof, and improving the productivity thereof.

In addition, in the case of the vehicle 10 according to the comparative example, the high-voltage electric energy generated by the cell stack 30 is discharged and removed by the COD heater 20 through a high-voltage cable. However, since a high-voltage cable for the COD heater 20 is exposed to the outside, it may be short-circuited, cut, or disconnected by deformation of an engine compartment in the event of a collision of the vehicle 10 or the like, before voltage is removed and decreased to a safe level. In this case, the COD heater 20 may not perform the function of removing residual voltage.

However, the vehicle 300A or 300B including the fuel cell according to an exemplary embodiment is configured such that the first DC/DC converter 320 and the power distributor 330A or 330B are directly connected to each other (refer to "334" in FIG. 1 or 6) without a cable or such that a cable electrically connecting the first DC/DC converter 320 and the power distributor 330A or 330B to each other is accommodated in the case 400A shown in FIG. 7 so as not to be exposed to the outside. Thus, even when an engine compartment is deformed due to a collision of the vehicle 300A or 300B, there is no cable to be damaged, or the cable is prevented from being damaged. As a result, it is possible to stably discharge residual energy and thus to secure electrical stability.

As is apparent from the above description, the embodiments provide a vehicle including a fuel cell and a residual energy discharge method performed in the vehicle for improving the durability of a cell stack and preventing an electric shock or an electrical fire in the event of a collision of a vehicle or during maintenance and repair of a vehicle. In addition, it is possible to reduce manufacturing costs of the vehicle, to simplify the configuration thereof, to reduce the volume thereof, and to improve the productivity thereof. In addition, it is possible to stably discharge residual energy and thus to secure electrical stability.

The above-described various embodiments may be combined with each other without departing from the object of the present disclosure unless they are contrary to each other. In addition, for any element that is not described in detail of any of the various embodiments, reference may be made to the description of an element having the same reference numeral in another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A vehicle comprising a fuel cell, the vehicle comprising:
   a cell stack comprising a plurality of unit cells stacked on one another;
   a direct current/direct current (DC/DC) converter configured to convert a level of a stack voltage output from the cell stack, the DC/DC converter comprising a discharger to remove residual energy thereof;
   a controller configured to generate first control signals depending on whether the vehicle is traveling normally; and
   a power distributor configured to distribute a level-converted voltage which is output from the DC/DC converter or to provide a voltage remaining in the cell stack to the discharger to discharge the voltage in response to the first control signals.

2. The vehicle according to claim 1, further comprising: a cooling line configured to cool the DC/DC converter, wherein the discharger is disposed in the cooling line.

3. The vehicle according to claim 1, wherein the controller is further configured to generate second control signals depending on whether the vehicle is traveling normally, and
   wherein the vehicle further comprises a battery configured to be charged with the level-converted voltage distributed by the power distributor, depending on levels of the second control signals or depending on whether the second control signals are being generated.

4. The vehicle according to claim 3, wherein the power distributor comprises:
   a first switching unit configured to form a first path along which the level-converted voltage output from the DC/DC converter is provided to the battery, depending on whether a $1\text{-}1^{st}$ control signal is being generated, the $1\text{-}1^{st}$ control signal being one of the first control signals; and a second switching unit configured to form a second path along which a voltage remaining in the cell stack is provided to the discharger, depending on whether a $1\text{-}2^{nd}$ control signal is being generated, the $1\text{-}2^{nd}$ control signal being another one of the first control signals.

5. The vehicle according to claim 4, wherein, when the vehicle is not traveling normally, the controller stops generating the $1\text{-}2^{nd}$ control signal.

6. The vehicle according to claim 5, further comprising:
a vehicle ON/OFF determiner configured to determine whether the vehicle has been turned off,
wherein the controller stops generating the $1\text{-}2^{nd}$ control signal depending on a result of a determination by the vehicle ON/OFF determiner.

7. The vehicle according to claim 5, further comprising:
a collision determiner configured to determine whether the vehicle has been involved in a collision,
wherein the controller stops generating the $1\text{-}2^{nd}$ control signal depending on a result of a determination by the collision determiner.

8. The vehicle according to claim 4, wherein the DC/DC converter comprises a first output terminal and a second output terminal,
wherein the level-converted voltage corresponds to a potential difference between the first output terminal and the second output terminal, and
wherein the first switching unit comprises:
a first switch disposed in a first line interconnecting the first output terminal and the battery while being disposed therebetween, the first switch being configured to be switched on or off depending on whether the $1\text{-}1^{st}$ control signal is being generated; and
a second switch disposed in a second line interconnecting the second output terminal and the battery while being disposed therebetween, the second switch being configured to be switched on or off depending on whether the $1\text{-}1^{st}$ control signal is being generated.

9. The vehicle according to claim 8, wherein the second switching unit comprises a third switch interconnecting the first output terminal and one end of the discharger while being disposed therebetween, the third switch being configured to be switched on or off depending on whether the $1\text{-}2^{nd}$ control signal is being generated, and
wherein an opposite end of the discharger is connected to the second output terminal.

10. The vehicle according to claim 8, wherein the second switching unit comprises a fourth switch interconnecting the second output terminal and an opposite end of the discharger while being disposed therebetween, the fourth switch being configured to be switched on or off depending on whether the $1\text{-}2^{nd}$ control signal is being generated, and
wherein one end of the discharger is connected to the first output terminal.

11. The vehicle according to claim 8, wherein the battery comprises:
a charger configured to be charged with the level-converted voltage; and
a third switching unit configured to form a third path along which the level-converted voltage is charged in the charger depending on whether the second control signals are being generated or depending on levels of the second control signals.

12. The vehicle according to claim 11, wherein the third switching unit comprises:
a fifth switch disposed between the first line and the charger, the fifth switch being configured to be switched on or off depending on whether a $2\text{-}1^{st}$ control signal is being generated or depending on a level of the $2\text{-}1^{st}$ control signal, the $2\text{-}1^{st}$ control signal being one of the second control signals; and
a sixth switch disposed between the second line and the charger, the sixth switch being configured to be switched on or off depending on whether a $2\text{-}2^{nd}$ control signal is being generated or depending on a level of the $2\text{-}2^{nd}$ control signal, the $2\text{-}2^{nd}$ control signal being another one of the second control signals.

13. The vehicle according to claim 3, wherein the power distributor comprises:
a first switching unit configured to form a first path along which the level-converted voltage output from the DC/DC converter is provided to the battery depending on a level of a $1\text{-}1^{st}$ control signal, the $1\text{-}1^{st}$ control signal being one of the first control signals; and
a second switching unit configured to form a second path along which a voltage remaining in the cell stack is provided to the discharger depending on a level of a $1\text{-}2^{nd}$ control signal, the $1\text{-}2^{nd}$ control signal being another one of the first control signals.

14. The vehicle according to claim 1, wherein the DC/DC converter and the power distributor are configured to be directly and electrically connected to each other.

15. The vehicle according to claim 1, further comprising:
a case configured to accommodate the DC/DC converter and the power distributor.

16. The vehicle according to claim 15, further comprising:
a wire configured to electrically connect the DC/DC converter and the power distributor to each other,
wherein the case comprises:
a first case configured to accommodate the DC/DC converter; and
a second case configured to accommodate the power distributor.

17. The vehicle according to claim 1, wherein the discharger has a resistance value of $1\Omega$ to $10\Omega$.

18. A residual energy discharge method performed in a vehicle including a fuel cell comprising a cell stack in which a plurality of unit cells is stacked on one another, and a direct current/direct current (DC/DC) converter configured to convert a level of a stack voltage output from the cell stack, the DC/DC converter comprising a discharger to remove residual energy thereof, the residual energy discharge method comprising:
determining whether the vehicle is traveling normally;
upon determining that the vehicle is traveling normally, distributing a level-converted voltage output from the DC/DC converter; and
upon determining that the vehicle is not traveling normally, providing a voltage remaining in the cell stack to the discharger to discharge the voltage.

19. The residual energy discharge method according to claim 18, wherein the determining whether the vehicle is traveling normally comprises at least one of:
determining whether the vehicle has been turned off; or
determining whether the vehicle has been involved in a collision, and
wherein, upon determining that the vehicle has been turned off or that the vehicle has been involved in a collision, it is determined that the vehicle is not traveling normally.

* * * * *